US 11,144,519 B2

United States Patent
Shabi et al.

(10) Patent No.: US 11,144,519 B2
(45) Date of Patent: Oct. 12, 2021

(54) DEDUPLICATING FULL AND PARTIAL BLOCK MATCHES

(71) Applicant: EMC IP Holding Company LLC, Hopkinton, MA (US)

(72) Inventors: Uri Shabi, Tel Mond (IL); Ronen Gazit, Tel Aviv (IL); Alon Titelman, Herzliya (IL); Alex Soukhman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 16/668,523

(22) Filed: Oct. 30, 2019

(65) Prior Publication Data

US 2021/0133164 A1 May 6, 2021

(51) Int. Cl.
*G06F 16/00* (2019.01)
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
CPC ........................... G06F 16/215; G06F 16/2255
See application file for complete search history.

(56) References Cited

U.S. PATENT DOCUMENTS

| | | | |
|---|---|---|---|
| 5,990,810 A | 11/1999 | Williams | |
| 8,799,601 B1 | 8/2014 | Chen et al. | |
| 8,898,120 B1 * | 11/2014 | Efstathopoulos | G06F 16/11 707/692 |
| 9,569,455 B1 | 2/2017 | Bono et al. | |
| 10,037,336 B1 | 7/2018 | Hu et al. | |
| 10,078,583 B1 * | 9/2018 | Wallace | G06F 3/0608 |
| 10,452,297 B1 * | 10/2019 | Karr | G06F 3/0673 |
| 10,564,848 B2 * | 2/2020 | Maeda | G11C 16/10 |
| 2011/0055621 A1 * | 3/2011 | Mandagere | G06F 11/1435 714/6.3 |
| 2011/0099351 A1 * | 4/2011 | Condict | G06F 3/0608 711/216 |
| 2011/0238635 A1 | 9/2011 | Leppard | |

(Continued)

OTHER PUBLICATIONS

Breitinger, Frank. "On the utility of bytewise approximate matching in computer science with a special focus on digital forensics investigations." https://tuprints.ulb.tu-darmstadt.de/4055/1/20140717_Dissertation_Breitinger_final.pdf (2014). (Year: 2014).*

(Continued)

*Primary Examiner* — Diedra McQuitery
(74) *Attorney, Agent, or Firm* — BainwoodHuang

(57) ABSTRACT

A technique for performing deduplication traverses a deduplication database and assigns digest values in the database to buckets, where each bucket covers a respective range of digest values. To deduplicate a particular candidate block, the technique generates a digest from the candidate block and searches for the computed digest in a subset of the buckets, where the subset is selected based on the computed digest. If a target block providing an exact match or a suitably close partial match is found in the subset of buckets, the technique effects storage of the candidate block at least in part by providing a reference to the target block.

19 Claims, 6 Drawing Sheets

(56) References Cited

U.S. PATENT DOCUMENTS

| | | |
|---|---|---|
| 2013/0097380 A1 | 4/2013 | Colgrove et al. |
| 2014/0115260 A1 | 4/2014 | Maybee et al. |
| 2015/0019501 A1* | 1/2015 | Akirav .................. G06F 3/0641 707/692 |
| 2015/0127621 A1* | 5/2015 | Kuo ........................ G06F 3/061 707/692 |
| 2016/0188622 A1 | 6/2016 | Sharangpani |
| 2018/0004434 A1 | 1/2018 | Khan et al. |
| 2018/0039442 A1 | 2/2018 | Shadrin et al. |
| 2018/0285379 A1 | 10/2018 | Dain et al. |
| 2019/0379394 A1* | 12/2019 | Hallak .................. G06F 16/137 |

OTHER PUBLICATIONS

Armangau, Philippe, et al.; "Inline Deduplication of Compressed Data," U.S. Appl. No. 14/980,944, filed Dec. 28, 2015.

Armangau, Philippe, et al.; "Speeding De-Duplication Using a Temporal Digest Cache," U.S. Appl. No. 15/668,388, filed Aug. 3, 2017.

Armangau, Philippe, et al.; "Speeding Deduplication Using a Most Wanted Digest Cache," U.S. Appl. No. 15/799,117, filed Oct. 31, 2017.

Swift, Jeremy; "Deduplication and Compression of Data Segments in a Data Storage System," U.S. Appl. No. 15/976,371, filed May 10, 2018.

\* cited by examiner

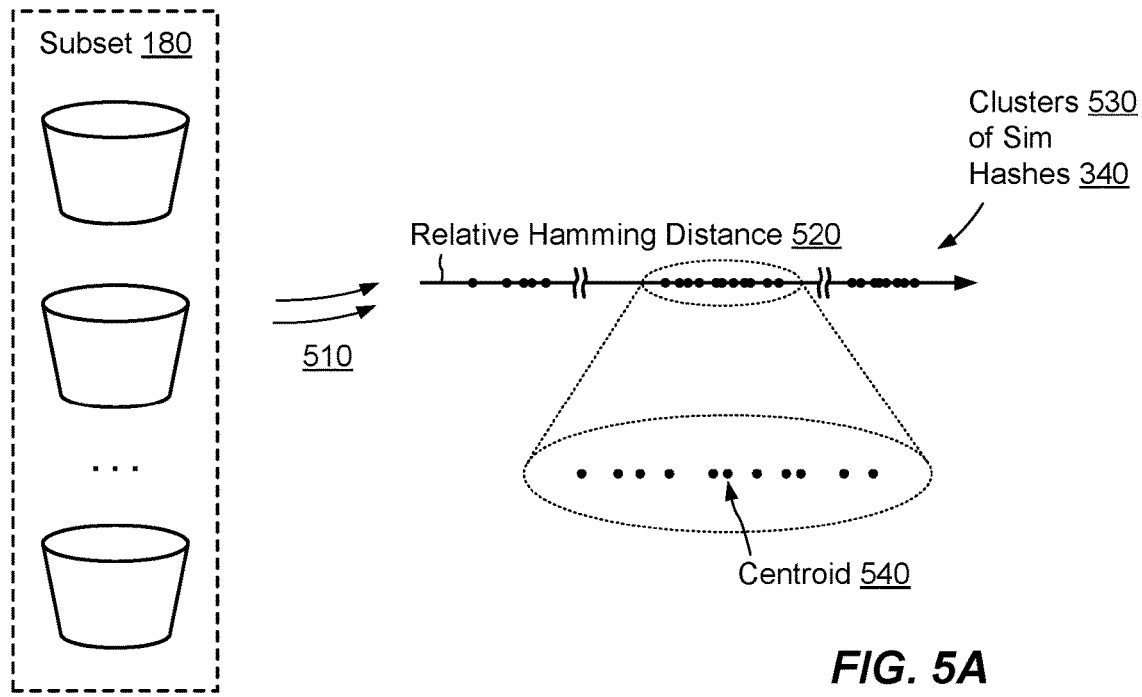
FIG. 5A
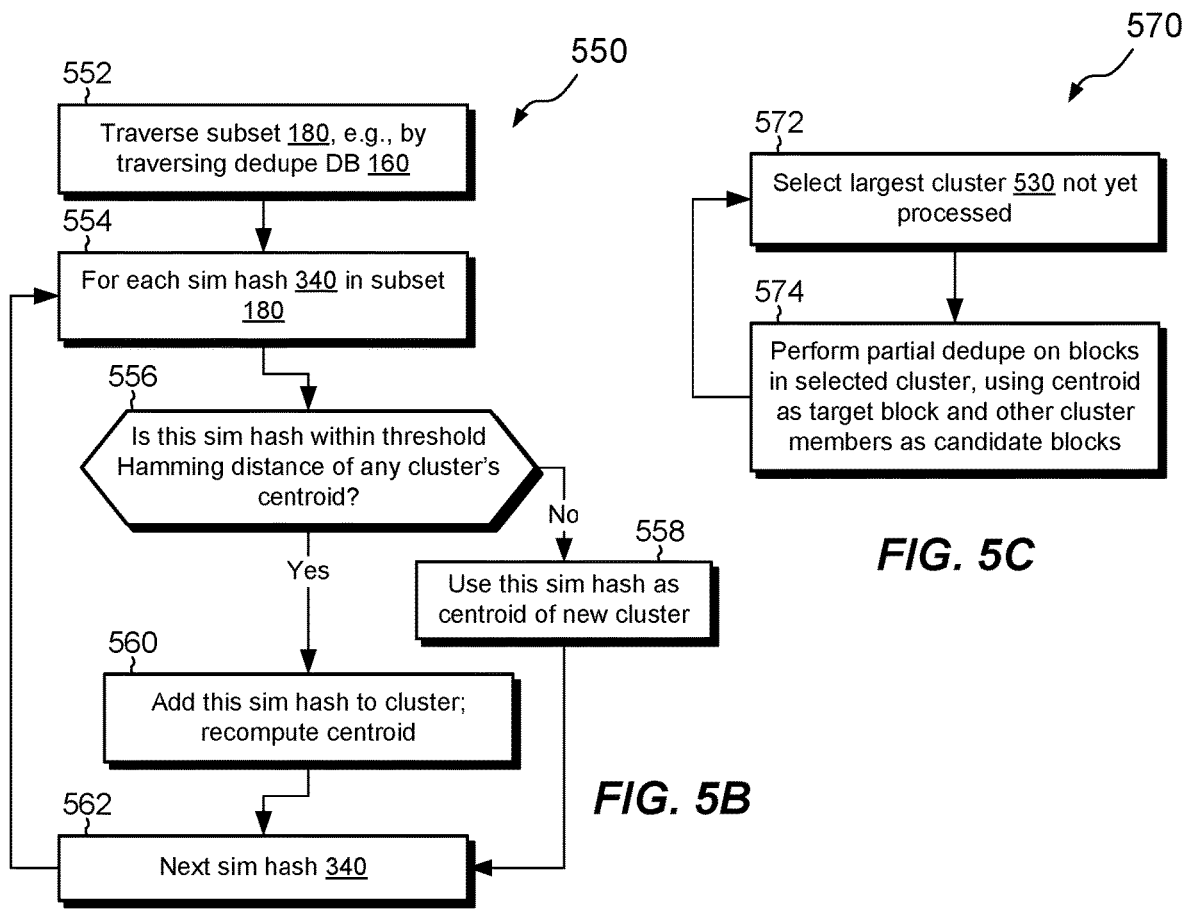
FIG. 5B
FIG. 5C

DEDUPLICATING FULL AND PARTIAL BLOCK MATCHES

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems use a process called "deduplication" to improve storage efficiency. For example, a storage system maintains a database of entries, in which each entry stores a digest of a respective block of data and a pointer to a stored version of that block in the storage system. The storage system computes each digest as a hash of a respective block, such that different blocks produce different hash values (digests) and identical blocks produce the same hash values. The high uniqueness of hash values enables the storage system to use them as representatives of respective blocks, even though the hash values themselves are typically much smaller than the blocks they represent. When a storage system receives a write request that specifies a candidate block to be stored at a designated logical address, the storage system computes a hash of the candidate block and performs a lookup into the database for the computed hash. If a match is found, the storage system may confirm the match by comparing the newly-arriving block with the block pointed to by the matching digest entry (although this step may be omitted if a fully-cryptographic hash function, such as SHA-2 or MD5, is used). Assuming the blocks match, the storage system effectuates storage of the newly-arriving block by pointing its logical address to the previously-stored block pointed to by the matching entry. Redundant storage of the block is therefore avoided. Deduplication may be run in-line with storage requests, near inline, or in the background.

SUMMARY

Conventional deduplication schemes require exact matches between hash values to perform block matching. Many blocks differ from one another only slightly, such as by having different timestamps or other metadata. Unfortunately, even small differences between blocks produce large differences in hash values. As a result, conventional deduplication schemes often miss opportunities to achieve better data reduction.

In contrast with conventional schemes, in which deduplication requires exact matching of digest values, an improved technique for performing deduplication traverses a deduplication database and assigns digest values in the database to buckets, where each bucket covers a respective range of digest values. To deduplicate a particular candidate block, the technique generates a digest from the candidate block and searches for the computed digest in a subset of the buckets, where the subset is selected based on the computed digest. If an exact match to the candidate block exists, the subset of buckets includes the exact match. The subset of buckets also includes blocks that partially match the candidate block. If a target block providing an exact match or a suitably close partial match is found in the subset of buckets, the technique effects storage of the candidate block at least in part by providing a reference to the target block.

Advantageously, the improved technique locates both exact matches and partial matches and achieves deduplication even when blocks contain portions of data that differ. Improved data reduction is therefore achieved.

According to some examples, digest values include similarity hash values ("sim hashes"), which differ from one another in relation to differences in the data from which the sim hashes are produced. Sim hashes produced from similar data are similar, and sim hashes produced from increasingly different data are increasingly different. The use of sim hashes greatly improves the chances of finding suitable partial matches in the subset of buckets.

According to some examples, the improved technique performs clustering on sim hashes based on similarity. According to some variants, the technique performs deduplication on blocks represented by sim hashes in the same cluster, e.g., by selecting a target block in the cluster and deduplicating other blocks in the cluster against the target block.

Certain embodiments are directed to a method of performing data deduplication. The method includes assigning multiple digests in a deduplication database to multiple buckets, each bucket dedicated to a respective range of digest values. Upon obtaining a candidate block of data to be deduplicated, the method further includes generating a candidate digest of the candidate block and searching a subset of the buckets for the candidate digest, the subset of the buckets selected for searching based on the candidate digest. In response to the searching identifying a target digest that represents a target block that at least partially matches the candidate block, the method still further includes effectuating storage of the candidate block at least in part by providing a reference to the target block.

Other embodiments are directed to a computerized apparatus constructed and arranged to perform a method of performing data deduplication, such as the method described above. Still other embodiments are directed to a computer program product. The computer program product stores instructions which, when executed on control circuitry of a computerized apparatus, cause the computerized apparatus to perform a method of performing data deduplication, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIGS. 5A-5C provide: a diagram that shows an example arrangement for clustering blocks based on sim hashes (FIG. 5A); a flowchart that shows an example method for clustering blocks based on sim hashes (FIG. 5B); and a flowchart that shows an example method of deduplicating blocks in a cluster.

DETAILED DESCRIPTION

Embodiments of the improved technique will now be described. One should appreciate that such embodiments are provided by way of example to illustrate certain features and principles but are not intended to be limiting.

An improved technique for performing deduplication traverses a deduplication database and assigns digest values in the database to buckets, where each bucket covers a respective range of digest values. To deduplicate a particular candidate block, the technique generates a digest from the candidate block and searches for the computed digest in a subset of the buckets, where the subset is selected based on the computed digest. If a target block providing an exact match or a suitably close partial match is found in the subset of buckets, the technique effects storage of the candidate block at least in part by providing a reference to the target block.

Figure 1:
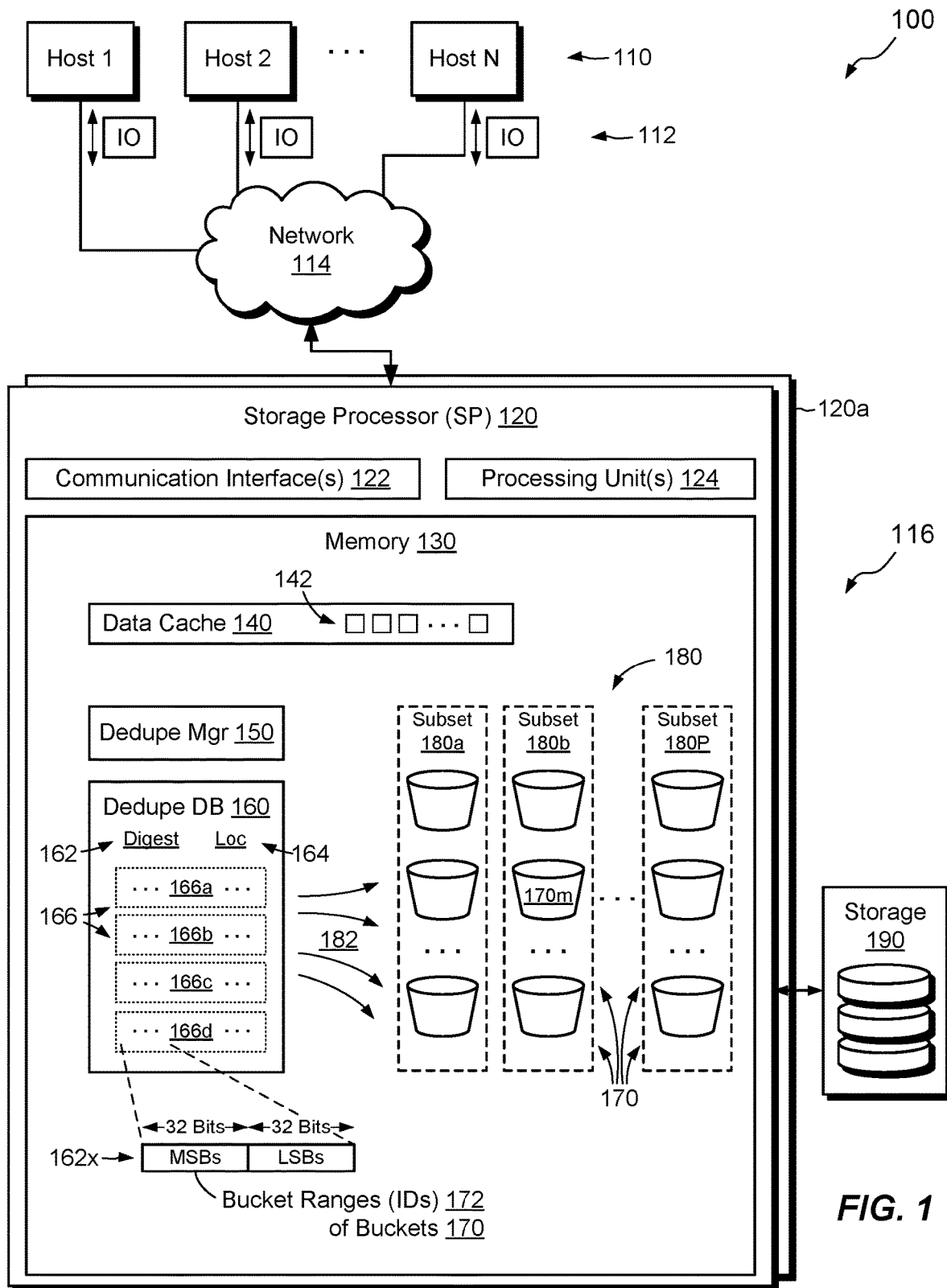
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be provided. No particular hardware configuration is required, however, as any number of SPs may be used, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 140, a deduplication ("dedupe") manager 150, and a dedupe database 160. The data cache 140 is configured to receive incoming writes of the I/O requests 112 and to store data 142 specified by those writes until the data 142 can be persisted in storage 190. The dedupe manager 150 is configured to orchestrate deduplication activities, such as maintaining the dedupe database 160 and directing deduplication of data blocks. The dedupe database 160 is configured to store entries that associate digests 162 of data blocks with corresponding storage locations 164. The storage locations 164 are those of data blocks from which the respective digests 162 are produced. In an example, each entry (not shown) associates one digest 162 with one location 164. As seen at the bottom-left of FIG. 1, a representative digest 162x has a 64-bit value, which includes 32 MSBs (most significant bits) and 32 LSBs (least significant bits). Digests 162 may have any size and may be divided in any suitable manner, however.

In some examples, the dedupe database 160 is stored persistently in storage 190, with portions loaded into memory 130 as needed. In some examples, the in-memory version of the dedupe database 160 arranges the digests in pages 166, such as pages 166a through 166d. Any number of pages 166 may be provided.

In example operation, the dedupe manager 150 builds the dedupe database 160 by adding a new entry each time a data block is processed for deduplication but no match has yet been found. The dedupe manager 150 creates each entry by generating a digest 162 from a respective data block and storing the digest 162 in connection with a location 164 of that data block, which may be a cached location, a persisted location, or any other location, for example.

Over time, the dedupe database 160 may grow quite large. In accordance with improvements hereof, the dedupe manager 150 accesses the dedupe database 160 and proceeds to assign 182 digests 162 in the database 160 to buckets 170. The dedupe manager 150 assigns digests 162 to buckets 170 based on digest values. For example, the MSBs of digests 162 (e.g., the leftmost 32 bits; see digest 162x) may form bucket identifiers (IDs) 172, which uniquely identify respective buckets 170. As there are 32 bits of MSBs in the example shown, up to $2^{32}$ unique buckets 170 may be addressed. Also, each bucket 170 can be associated with as many individual digests as the LSBs (rightmost bits) will allow. As there are 32 bits of LSBs (as shown), each bucket 170 can "contain" (have associated therewith) up to $2^{32}$ unique digests 162. With the pictured arrangement, each bucket 170 can be regarded as having a "range," where each range includes all the digests 162 that have the same MSBs.

In an example, the dedupe manager 150 creates buckets 170 as needed based on the digests 162 it encounters while traversing the dedupe database 160. Thus, it is not necessary for the dedupe manager 150 to create $2^{32}$ buckets 170 in advance and, typically, the actual number of buckets 170 in use at any given time is much smaller than $2^{32}$.

In some examples, the dedupe manager 150 assigns 182 digests 162 to buckets 170 by accessing multiple pages 166 of the dedupe database 160 (i.e., the in-memory version) and processing multiple pages 166 together. Operating in this manner has the effect of amortizing data access over large amounts of data and leveraging locality of data and related metadata.

One should appreciate that assigning digests 162 to buckets 170 need not require copying or moving of any data. Rather, each bucket 170 may be realized as a list of digests 162 or associated entries, which are stored in the dedupe database 160.

As further shown in FIG. 1, the dedupe manager 150 may further arrange buckets 170 into subsets 180 of buckets 170 (e.g., subsets 180a-180P). In an example, subsets 180 of buckets are formed based on similarities among bucket IDs 172. Similarity may be measured, for example, based on Hamming distance, i.e., numbers of bits (or other symbols) that are different. For example, a bucket ID 172 of "AB124F76" (in hexadecimal notation) has a Hamming difference of 1 from a bucket ID of "BB124F76," as only a single bit is different. Likewise, the bucket ID 172 of "AB1 24F76" has a Hamming difference of 2 from "BB134F76," as 2 bits are different.

As bucket IDs 172 in the example shown are formed from 32 MSBs, there are exactly 32 bucket IDs 172 that differ by a Hamming distance of 1 from any given bucket ID. A much larger number of bucket IDs differ by a Hamming distance of 2.

In an example, the dedupe manager 150 creates each subset 180 of buckets 170 by combining a matching bucket 170m, i.e., a bucket whose ID 172 exactly matches the MSBs of a digest 162, with each of the other buckets 170 whose bucket IDs 172 are a predetermined Hamming distance away from that of the matching bucket 170m. In an example, the predetermined Hamming distance is 1, meaning that each subset 180 contains 33 buckets—the matching bucket 170m and the 32 buckets that are one unit of Hamming distance away.

The use of buckets 170 provides an effective platform for performing deduplication, whether inline, near-inline, or in the background. The advantages are particularly pronounced when digests 162 include similarity hashes, i.e., hashes for which similarities among digests 162 correspond to similarities among data blocks from which the hashes are created. Example similarity hashes are described more fully in connection with FIG. 3.

Figure 2A:
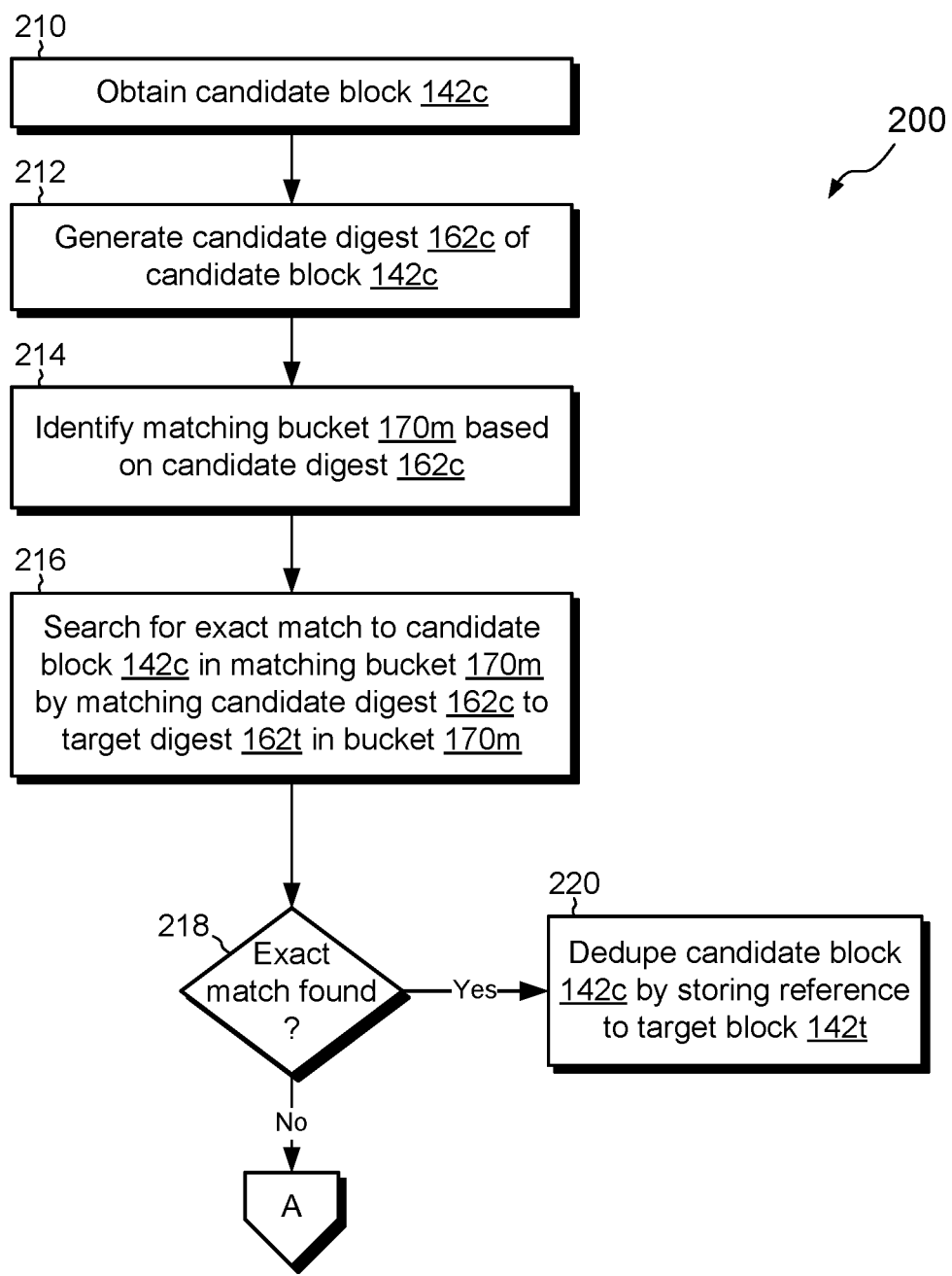
FIGS. 2A and 2B are flowcharts that show an example method of deduplicating a candidate block in the environment of FIG. 1.
Figure 2B:
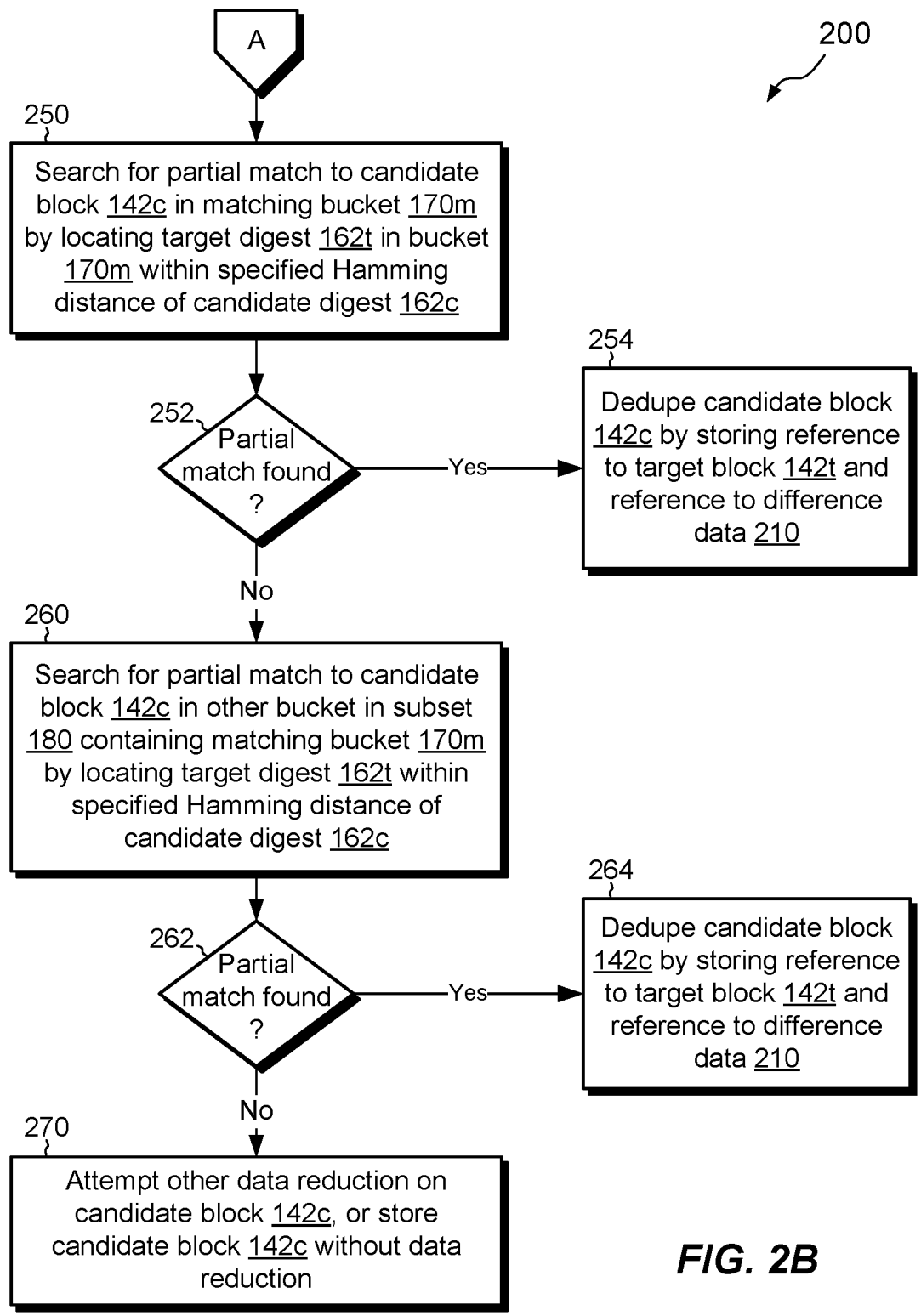

FIGS. 2A and 2B show an example method 200 for deduplicating data. The method 200 may be carried out, for example, by the dedupe manager 150 and the other software constructs shown in FIG. 1. Although the acts of method 200 are shown in a particular order, the depicted order is an example only, and other examples may include performing acts in orders different from the one shown, which may include performing some acts simultaneously.

At 210 of FIG. 2A, a candidate block 142c is obtained. For example, the dedupe manager 150 obtains the candidate block 142c from the data cache 140 (e.g., in the inline dedupe case) or from storage 190 (in the background case).

At 212, the dedupe manager 150 generates a candidate digest 162c from the candidate block 142c, e.g., by generating a sim hash of the candidate block 142c.

At 214, the dedupe manager 150 identifies a matching bucket 170m based on the candidate digest 162c, e.g., by forming a bucket ID 172 from the MSBs of the candidate digest 162c and searching for a bucket with that bucket ID. If no bucket ID 172 exists for these MSBs, the dedupe manager 150 may create a new bucket whose bucket ID 172 matches the MSBs.

At 216, the dedupe manager 150 searches for an exact match to the candidate block 142c in the matching bucket 170m, e.g., by attempting to match the candidate digest 162c to a target digest 162t of a block assigned to the matching bucket 170m. Depending on the uniqueness of the digests 162, the dedupe manager 150 may confirm the match, e.g., by comparing the data of the candidate block 142c with that of the target block 142t and verifying that they are the same. In some examples, the digests 162 may include cryptographic hashes of respective blocks (e.g., in addition to sim hashes). In such an example, the dedupe manager 150 may confirm the match by comparing cryptographic hashes.

At 218, if an exact match is found, operation proceeds to 220, whereupon the dedupe manager 150 deduplicates the candidate block 142c by storing a reference to the target block 142t. For example, the dedupe manager 150 maps a logical address of the candidate block 142c to the data of the target block 142t, which me be found at the location 164 of the target block 142t, as stored in the dedupe database 160.

If no exact match is found at 218, operation instead proceeds to 250 (FIG. 2B), whereupon the dedupe manager 150 searches for a partial match to the candidate block 142c in the matching bucket 170m. The dedupe manager 150 may achieve this end, for example, by locating a target block 142t whose digest 162t differs from that of the candidate block 142c by less than a predetermined Hamming distance, such as 1, for example.

At 252, if a partial match can be found in the matching bucket 170m within the predetermined Hamming distance, operation proceeds to 254, whereupon the dedupe manager 150 deduplicates the candidate block 142c by providing a reference to the target block 142t, e.g., in a manner similar to that described in connection with act 220 above. The dedupe manager 150 also provides a reference to difference data 210, i.e., data that indicates a difference between the candidate block 142c and the target block 142t.

The difference data 210 may be provided in any suitable way. In one example, the dedupe manager 150 computes the difference data 210 as a bitwise XOR (exclusive-OR) of the candidate block 142c with the target block 142t. The result of the XOR function has a 1 at every bit location where the two blocks differ and a 0 at every bit location where the two blocks are the same. The XOR result may be compressed to a small size and stored. Later, when it becomes necessary to reconstruct the candidate block 142c, the SP 120 can obtain the target block 142t and the difference data 210, decompress them, and XOR them together, with the result of the XOR restoring the original candidate block 142c.

Continuing from 252, if no partial match can be found within the predetermined Hamming distance, operation proceeds to 260, whereupon the dedupe manager 150 extends the scope of the search for a suitable target block 142t to the other buckets 170 in the same subset 180, i.e., the subset of buckets that contains the matching bucket 170m.

At 262, if a partial match can be found in any of the buckets 170 of the subset within the predetermined Hamming distance, operation proceeds to 264, whereupon the dedupe manager 150 deduplicates the candidate block 142c as in 254, by providing references to both the target block 142t and the difference data 210.

If no suitable partial match can be found, e.g., within a Hamming distance of 1, operation proceeds to 270, whereupon the SP 120 may attempt other strategies to achieve data reduction on the candidate block 142c. If no good options are available, the dedupe manager 150 may simply store the candidate block 142c without using data reduction.

Figure 3:
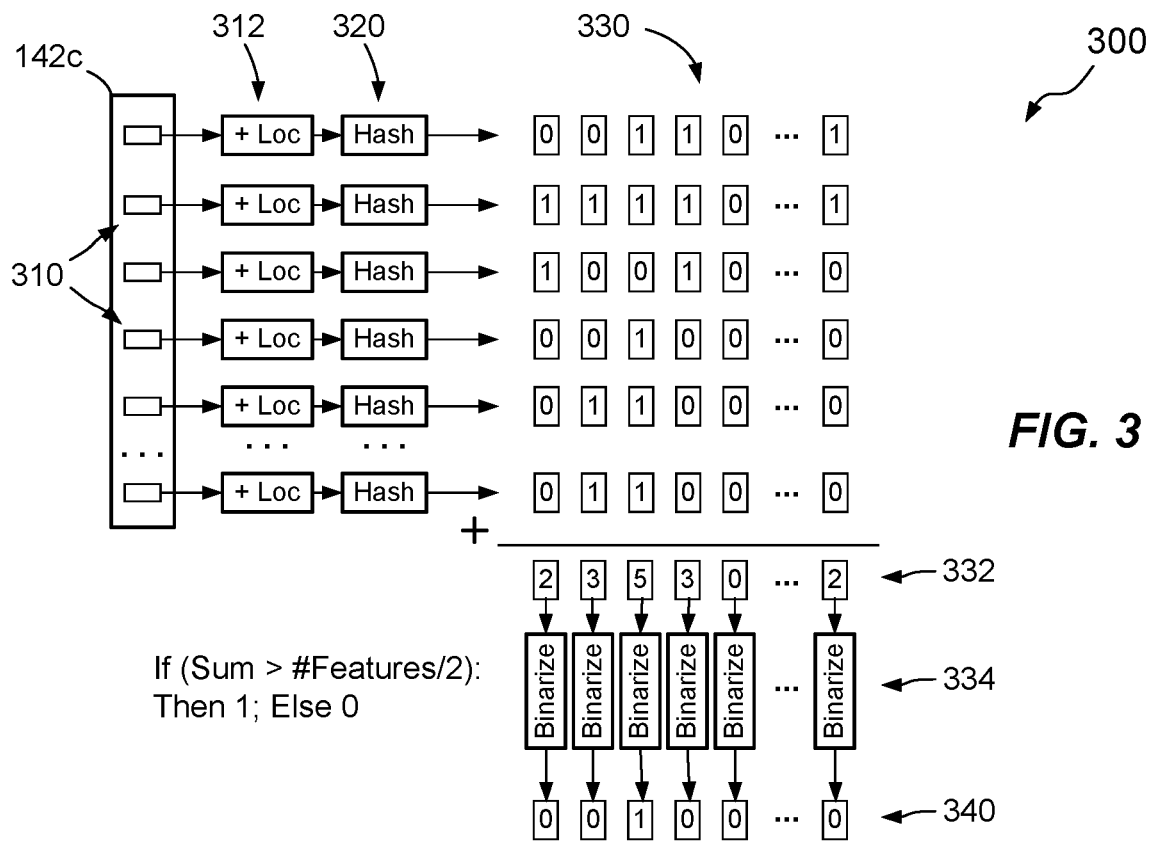
FIG. 3 is a block diagram that shows an example arrangement for generating a similarity hash (sim hash) of a candidate block.

FIG. 3 shows an example arrangement 300 for generating a similarity hash (sim hash) 340. Many methods may be used for generating sim hashes, and the example shown is intended to be illustrative rather than limiting.

The illustrated approach begins by obtaining a candidate block 142c and dividing the block into multiple features 310. Each feature 310 is a portion of the candidate block 142c, and together the features 310 make up the entire candidate block 142c. Features 310 may be arbitrarily small, with 4 or 8 Bytes being expected sizes. There is no need for different features 310 to have the same length, however.

As shown by arrow 312, the data of each feature 310 is salted with a location indicator, which corresponds, for example, to a relative position of the respective feature in the block 142c. For instance, the first feature (topmost) may be salted by concatenating this feature with a "1," the second feature may be salted by concatenating it with a "2," and so forth. Salting each feature 310 with an indicator of its position ensures that the same feature is represented differently when it appears in different positions within the block 142c.

As shown by arrow 320, a hash function is executed on each salted feature 310 individually. The hash function may be a fully cryptographic or semi-cryptographic hash function, for example.

As shown by arrow 330, each hash function produces a respective hash value, with one hash value produced for each feature 310. The bits of each hash value are shown horizontally, e.g., with the MSB of the hash value on the left and the LSB on the right.

The corresponding bits of the hash values are then summed (vertically) to produce a column sum 332 for each bit position of the feature-hashes. The column sums 332 are then binarized (334) to produce respective results. Binarizing each sum 332 includes, for example, setting the result to "1" if the column sum is greater than the number of features 310 in the block 142c divided by 2 and setting the result to "0" otherwise. Stated another way, results are set to "1" if more than half the bits in the column are "1;" otherwise they are set to "0." The results of binarization taken together and in order form a sim hash 340. The sim hash 340 thus includes a bit for each bit of the feature-hashes 330.

The sim hash 340 has the desired property of producing similar results for similar candidate blocks 142c but of producing increasingly different results for increasingly different candidate blocks 142c. The illustrated arrangement thus allows Hamming distances between sim hashes 340 to be used as a proxy for Hamming distances between the corresponding blocks. Owing to the manner in which sim hashes 340 are generated, they should generally not be relied upon for exact-block matching, as it is possible for two sim hashes 340 to be identical even though the underlying blocks are different.

Sim hashes 340 may form the entirety of digests 162 (one sim hash per digest), but this is not required. For example, digests 162 may include other components. These components may include full or semi-cryptographic hashes of respective blocks. They may also include sim hashes of particular sub-blocks. According to some variants, each digest 162 includes a sim hash of a particular sector of the respective block. The particular sector may be selected as the highest entropy sector in the block, such that blocks can be matched even if they are misaligned relative to usual block boundaries. In some examples, digests 162 include sector sim hashes but not full-block sim hashes, with the same methodology applied (e.g., buckets and subsets) as described above, but operating based on sector sim hashes rather than on full-block sim hashes.

Figure 4:
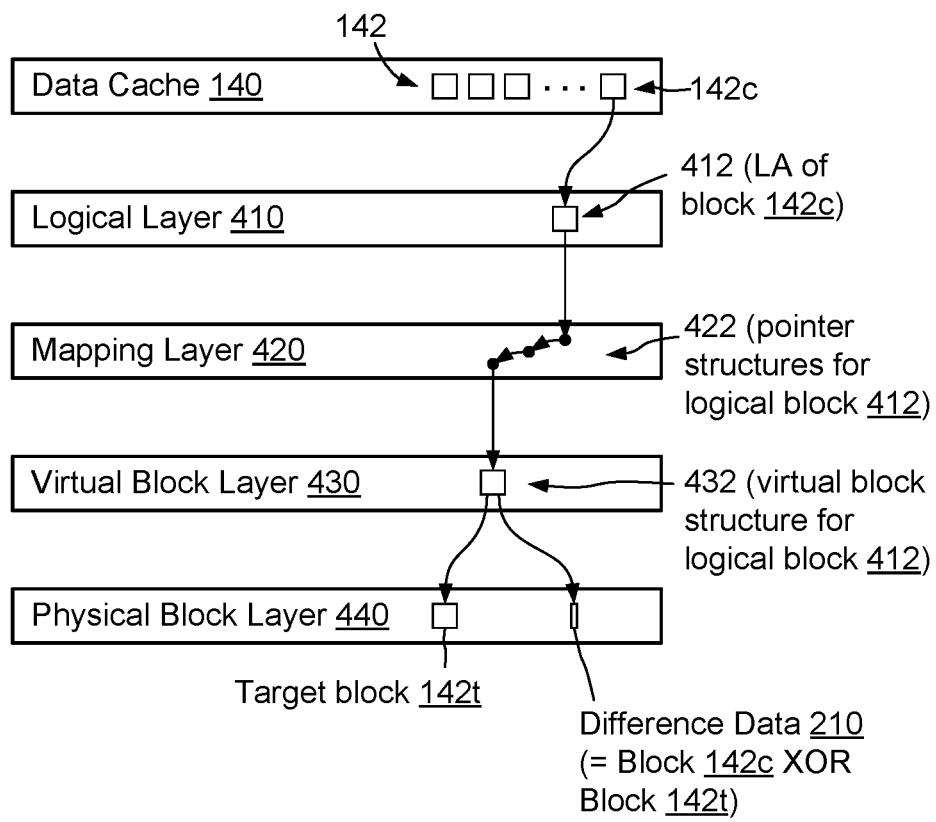
FIG. 4 is a block diagram that shows an example arrangement for mapping a deduplicated candidate block resulting from a partial match.

FIG. 4 shows an example arrangement for mapping data when performing partially matching deduplication. The structures shown in FIG. 4 may reside in the memory 130 of the SP 120, for example (FIG. 1).

As shown, the data cache 140 stores data elements 142, such as blocks, which include a candidate block 142c. For example, the blocks 142 may have been recently written to the data storage system by hosts 110. Each block 142 may have an associated logical address (LA), which the I/O request 112 that wrote the block has specified. Each logical address may correspond to a host address of the block, such as an offset into a file, a range of a LUN (Logical UNit), or the like.

To effect storage of the candidate block 142c, SP 120 represents a logical address 412 of the block 142c in a logical storage layer 410. The SP 120 then maps the logical address 412 to lower layers using mapping structures 422 (e.g., block pointers) in a mapping layer 420. The mapping layer 420 maps the logical address 412 to a virtual block structure 432 in a virtual block layer 430, and the virtual block structure 432 maps to a physical block layer 440. As the depicted arrangement supports partial block matching, the virtual block structure 432 provides two pointers, a first pointer to the target block 142t and a second pointer to the difference data 210. As described previously, the difference data 210 may be provided as a compressed version of the candidate block 142c XORed with the target block 142t. Additional layers (not shown) further map the target block 142t and difference data 210 to storage 190.

FIGS. 5A-5C show an example arrangement for using clustering to facilitate deduplication. As shown in FIG. 5A, a given subset 180 of buckets 170 provides a domain for performing clustering on digests 162. For example, the dedupe manager 150 performs clustering 510 on digests 162 (e.g., sim hashes 340) found in the buckets 170 of subset 180, by arranging the digests 162 based on relative Hamming distance 520. For example, a first digest 162 examined may provide a baseline against which relative Hamming distances 520 of other digests 162 may be measured. Buckets 170 may each include hundreds or more digests 162, and the digests 162 when arranged on a line based on relative Hamming distance 520 naturally tend to form clusters 530. Each cluster 530 has a centroid 540, which is typically the digest 162 closest to the center of that cluster 530. The centroid 540 is thus the digest 162 that has the smallest average Hamming distance to each of the other digests in the cluster.

FIG. 5B shows an example method 550 for performing the clustering 510 of FIG. 5A. The method 550 may be carried out, for example, by the dedupe manager 150 and/or other software constructs in the memory 130 (FIG. 1).

At 552, the dedupe manager 150 traverses the subset 180 of buckets 170 and obtains multiple digests 162 from the buckets. In an example, this operation involves the dedupe manager 150 accessing the dedupe database 160, e.g., by loading multiple pages 166, selecting a digest 162 from the dedupe database 160 as a candidate, and then forming a matching bucket 170m and corresponding subset 180 based on the selected candidate. In some examples, candidate selection is based at least in part on popularity. For example, entries in the dedupe database 160 may store reference counts (in addition to digests 162 and locations 164). The reference counts indicate how many logical addresses have been mapped to the block represented in that digest entry. Entries with high reference counts are likely to yield larger clusters 530 than entries with smaller reference counts and are thus preferred when selecting candidates. In some examples, the dedupe manager 150 skips the creation of buckets 170 and creates clusters 530 directly from the dedupe database 160. In this manner, contents of clusters 530 need not be limited to particular buckets 170 or subsets 180.

At 554, the dedupe manager 150 iterates over each digest 162 (sim hash) in the subset 180. At 556, for example, the dedupe manager 150 checks whether it can assign the current sim hash to any cluster 530, e.g., by determining whether the sim hash 340 is within a threshold Hamming distance of the centroid 540 of any cluster 530. If the dedupe manager 150 succeeds in finding a closely-matching cluster in this manner, then at 560 the dedupe manager 150 adds the current sim hash 340 to the closely-matching cluster 530. The dedupe manager 150 may also recompute the centroid 540 of this cluster 530 to account for the new member.

If at 554 no close-enough cluster 530 can be found, operation proceeds to 558, whereupon the current sim hash 340 may be used as the centroid 540 of a new cluster 530. Either way, operation proceeds to 562, where the acts 554-560 are repeated for a next sim hash 540.

One should appreciate that the method 550 is preferably run in the background, out of band with I/O requests 112, as available resources allow.

FIG. 5C shows an example method 570 for performing deduplication using the clusters 530. The method 570 may also be carried out by the dedupe manager 150 and/or other software constructs in the memory 130.

At 572, the dedupe manager 150 selects a cluster 530 for processing, preferably selecting the cluster having the greatest number of members.

At 574, the dedupe manager 150 performs a partial dedupe on the blocks represented by the selected cluster 530. In an example, partial deduplication is performed by using the block represented by the centroid 540 of the selected cluster 530 as a target block and using the blocks represented by all the other sim hashes 340 in the cluster 530 as candidate blocks. Partial block deduplication can then proceeds as described above, e.g., by effectuating storage of each candidate block by storing one reference to the target block (centroid) and another reference to difference data 210 (based on the difference between each candidate block and the centroid).

Once the current cluster 530 has been processed, operation returns to 572, whereupon the dedupe manager 150 obtains the next largest cluster and repeats step 574 for the new cluster. Operation proceeds in this manner indefinitely.

Method 570 preferably also runs in the background, as resources allow. In some examples, the methods 550 and 570 are performed more or less continuously, as lazy background processes, taking advantage of system resources when they are available to improve storage efficiency. Although cluster-based deduplication has been described with reference to computed centroids 540 of clusters 530, one should appreciate that the centroids 540 need not be precise and may be approximations rather than exact values. Also, although a particular clustering method has been described, embodiments are not limited to any particular type of clustering. Suitable example clustering methods may include K-means clustering, mean-shift clustering, Density-Based Spatial Clustering of Applications with Noise (DBSCAN), Expectation-Maximization (EM) Clustering using Gaussian Mixture Models (GMM), and agglomerative hierarchical clustering. Ad hoc clustering methods may be used, and different clustering methods may be combined in any suitable way.

Figure 6:
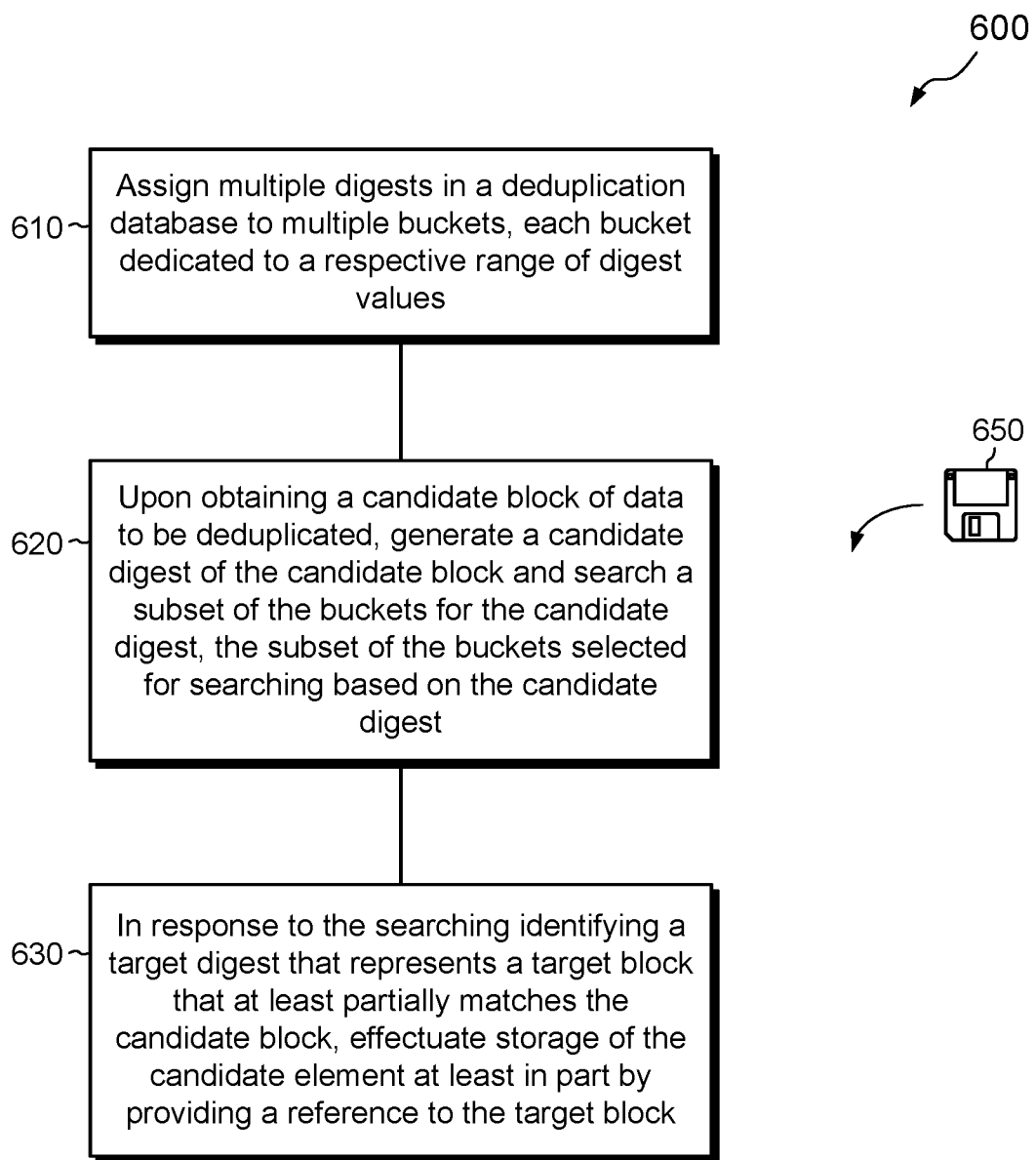
FIG. 6 is a flowchart showing an example method of performing deduplication.

FIG. 6 shows an example method 600 that may be carried out in connection with the environment 100. The method 600 is typically performed, for example, by the software constructs described in connection with FIG. 1, which reside in the memory 130 of the storage processor 120 and are run by the set of processors 124. The various acts of method 600 may be ordered in any suitable way. Accordingly, embodiments may be constructed in which acts are performed in orders different from that illustrated, which may include performing some acts simultaneously.

At 610, multiple digests 162 in a deduplication database 160 are assigned 182 to multiple buckets 170. Each bucket 170 is dedicated to a respective range 172 of digest values.

At 620, upon obtaining a candidate block 142c of data to be deduplicated, a candidate digest 162c is generated of the candidate block 142c and a subset 180 of the buckets 170 is searched for the candidate digest 162c. The subset 180 of the buckets 170 is selected for searching based on the candidate digest 162c, e.g., by using MSBs of the candidate digest 162c as a bucket ID 172 of a matching bucket 170m and including in the subset 180 the matching bucket 170m as well as all the other buckets whose bucket IDs are a predetermined Hamming distance away from that of the matching bucket 170m.

At 630, in response to the searching identifying a target digest 162t that represents a target block 142t that at least partially matches the candidate block 142c, storage of the candidate block 142c is effectuated at least in part by providing a reference to the target block 142t. In cases of partial matches, storage of the candidate block 142c may further be effectuated by providing a reference to difference data 210.

An improved technique has been described for performing deduplication. The technique traverses a deduplication database 160 and assigns digest values 162 in the database 160 to buckets 170, where each bucket 170 covers a respective range 172 of digest values. To deduplicate a particular candidate block 142c, the technique generates a digest 162c from the candidate block and searches for the computed digest 162c in a subset 180 of the buckets 170, where the subset 180 is selected based on the computed digest 162c. If a target block 142t providing an exact match or a suitably close partial match is found in the subset 180 of buckets 170, the technique effects storage of the candidate block 142c at least in part by providing a reference to the target block 142t.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of performing data deduplication, the method comprising:
   assigning multiple digests in a deduplication database to multiple buckets, each bucket dedicated to a respective range of digest values;
   upon obtaining a candidate block of data to be deduplicated, generating a candidate digest of the candidate block and searching a subset of the buckets for the candidate digest, the subset of the buckets selected for searching based on the candidate digest; and
   in response to the searching identifying a target digest that represents a target block that at least partially matches the candidate block, effectuating storage of the candidate block at least in part by providing a reference to the target block,
   wherein each of the multiple digests in the deduplication database represents a respective data block and includes a similarity hash (sim hash), each sim hash generated from the respective data block and differing from sim hashes generated from other data blocks in relation to differences between the respective data block and the other data blocks.

2. The method of claim 1, wherein the subset of buckets includes a matching bucket dedicated to a range of digest values to which the candidate digest belongs.

3. The method of claim 2, wherein assigning the digests to the buckets is based on portions of the sim hashes, such that digests assigned to each bucket have sim hashes with identical portions.

4. The method of claim 3, further comprising locating an exact match to the candidate block in the matching bucket by confirming that the matching bucket contains a digest that matches the candidate digest.

5. The method of claim 3, further comprising locating a partial match to the candidate block in the matching bucket, the partial match having a sim hash that differs from a sim hash of the candidate digest by less than a predetermined Hamming distance.

6. The method of claim 3, further comprising locating a partial match to the candidate block in another bucket that is not the matching bucket, the other bucket chosen based on a range of the other bucket differing from the range of the matching bucket by less than a predetermined Hamming distance.

7. The method of claim 3, further comprising:
   locating the target block as a block that partially matches the candidate block in one of the buckets; and
   deduplicating the candidate block by referencing both the target block and difference data that provides a difference between the candidate block and the target block.

8. The method of claim 7, further comprising generating the difference data by XORing the candidate block with the target block.

9. The method of claim 8, wherein generating the difference data further comprises compressing a result of XORing the candidate block with the target block.

10. The method of claim 2, further comprising creating clusters by performing a clustering operation on digests assigned to designated buckets, the clusters arranged based on Hamming distances among sim hashes of the digests assigned to the designated buckets.

11. The method of claim 10, wherein the designated buckets include the matching bucket and other buckets whose ranges are within a predetermined Hamming distance of the range of the matching bucket.

12. The method of claim 11, further comprising performing background deduplication on results of the clustering operation, the background deduplication including:
   identifying a cluster to which multiple digests are assigned;
   selecting a representative digest assigned to the identified cluster; and performing partial deduplication on each of multiple blocks represented by other digests in the cluster, using a block corresponding to the representative digest as a deduplication target block.

13. The method of claim 12, further comprising:
ranking clusters based on their respective numbers of digests; and
preferentially performing background deduplication on larger clusters prior to performing background deduplication on smaller clusters.

14. A computerized apparatus, comprising control circuitry that includes a set of processing units coupled to memory, the control circuitry constructed and arranged to:
assign multiple digests in a deduplication database to multiple buckets, each bucket dedicated to a respective range of digest values;
upon obtaining a candidate block of data to be deduplicated, generate a candidate digest of the candidate block and search a subset of the buckets for the candidate digest, the subset of the buckets selected for searching based on the candidate digest; and
in response to the searching identifying a target digest that represents a target block that at least partially matches the candidate block, effectuate storage of the candidate block at least in part by providing a reference to the target block,
wherein each of the multiple digests in the deduplication database represents a respective data block and includes a similarity hash (sim hash), each sim hash generated from the respective data block and differing from sim hashes generated from other data blocks in relation to differences between the respective data block and the other data blocks.

15. A computer program product including a set of non-transitory, computer-readable media having instructions which, when executed by control circuitry of a computerized apparatus, cause the computerized apparatus to perform a method of performing data deduplication, the method comprising:
assigning multiple digests in a deduplication database to multiple buckets, each bucket dedicated to a respective range of digest values;
upon obtaining a candidate block of data to be deduplicated, generating a candidate digest of the candidate block and searching a subset of the buckets for the candidate digest, the subset of the buckets selected for searching based on the candidate digest; and
in response to the searching identifying a target digest that represents a target block that at least partially matches the candidate block, effectuating storage of the candidate block at least in part by providing a reference to the target block,
wherein each of the multiple digests in the deduplication database represents a respective data block and includes a similarity hash (sim hash), each sim hash generated from the respective data block and differing from sim hashes generated from other data blocks in relation to differences between the respective data block and the other data blocks.

16. The computer program product of claim 15,
wherein the subset of buckets includes a matching bucket dedicated to a range of digest values to which the candidate digest belongs.

17. The computer program product of claim 16, further comprising creating clusters by performing a clustering operation on digests assigned to designated buckets, the clusters arranged based on Hamming distances among sim hashes of the digests assigned to the designated buckets.

18. The computer program product of claim 17, wherein the designated buckets include the matching bucket and other buckets whose ranges are within a predetermined Hamming distance of the range of the matching bucket.

19. The computer program product of claim 18, wherein the method further comprises performing background deduplication on results of the clustering operation, the background deduplication including:
identifying a cluster to which multiple digests are assigned;
selecting a representative digest assigned to the identified cluster; and
performing partial deduplication on each of multiple blocks represented by other digests in the cluster, using a block corresponding to the representative digest as a deduplication target block.

* * * * *